Feb. 27, 1962 J. D. KUEHLER 3,023,343

INFORMATION RECORDING AND DISPLAY APPARATUS

Filed Jan. 11, 1960 2 Sheets-Sheet 1

INVENTOR.
Jack D. Kuehler

BY

Feb. 27, 1962 J. D. KUEHLER 3,023,343

INFORMATION RECORDING AND DISPLAY APPARATUS

Filed Jan. 11, 1960 2 Sheets-Sheet 2

INVENTOR.
Jack D. Kuehler

BY

United States Patent Office 3,023,343

Patented Feb. 27, 1962

3,023,343
INFORMATION RECORDING AND DISPLAY APPARATUS

Jack D. Kuehler, San Jose, Calif., assignor to International Business Machines Corporation, New York, N.Y., a corporation of New York Filed Jan. 11, 1960, Ser. No. 1,641
5 Claims. (Cl. 315—18)

The present invention relates to apparatus for recording information and for recovering recorded information. More particularly, the present invention relates to apparatus for recording information magnetically or electrostatically on recording surfaces in the form of "bits" which represent code units and which are either minute electrostatic charges on a dielectric surface, minute magnetized areas in a non-magnetized surface, or minute non-magnetized or differently magnetized areas in an otherwise uniformly magnetized surface. In the latter case these information bits may be established on a magnetized surface by subjecting predetermined spots thereof to impingement by an electron beam of sufficient strength and duration to heat said spots to a degree where their magnetism is changed—a method known as Curie point writing. The present invention is particularly concerned with apparatus for storing information in the form of information bits upon magnetized surfaces by means of Curie point writing and for visually displaying information thus recorded.

One method of sensing and recovering magnetically recorded information from a recording surface is to convert said surface into what is known as an "electron mirror." This is usually accomplished by placing the recording surface at a slightly more negative potential than a cathode from which a beam of electrons is sent toward said surface by means of an anode of appropriate potential. As a result thereof, the electrons are decelerated once they have passed the anode, reach a point of zero velocity at a level closely adjacent to but still out of contact with the recording surface, reverse their direction of movement and return to the anode in paths that are ordinarily closely adjacent and substantially parallel to their initial path of movement from the cathode toward the recording surface. However, if the surface area toward which the beam of electrons is directed exhibits magnetic or electrostatic fringe fields as a result of information bits recorded thereon, the electrons on entering such a field are deflected in a direction parallel to the recording surface by a component of the field, and in reversing their direction of movement depart laterally from the parallel path they would have taken in the absence of a fringe field adjacent the recording surface. This departure of the returning electrons from a course parallel to their initial course whenever they encounter a fringe field at the point of zero potential directly in front of the recording surface may be employed to indicate the presence or absence of information bits upon the recording surface.

It is an object of my invention to provide a simple and compact apparatus for visually displaying the presence of information bits upon a recording surface.

Another object of the invention is to provide a simple and efficient apparatus for both recording information in code bits upon a recording surface and for visually displaying information thus recorded whenever desired.

Yet another object of the invention is to provide an apparatus of the type referred to that is capable of resolving high density recordings.

Still another object of the invention is to provide an apparatus for visually indicating the presence and location of information bits of selected areas of a recording surface on an enlarged scale.

Furthermore, it is an object of the present invention to furnish an apparatus of the type referred to that provides variable magnification of the information bit displaying image.

These and other objects of the present invention will be apparent from the following description of the accompanying drawings which illustrate a preferred embodiment thereof and wherein.

Figure 1:
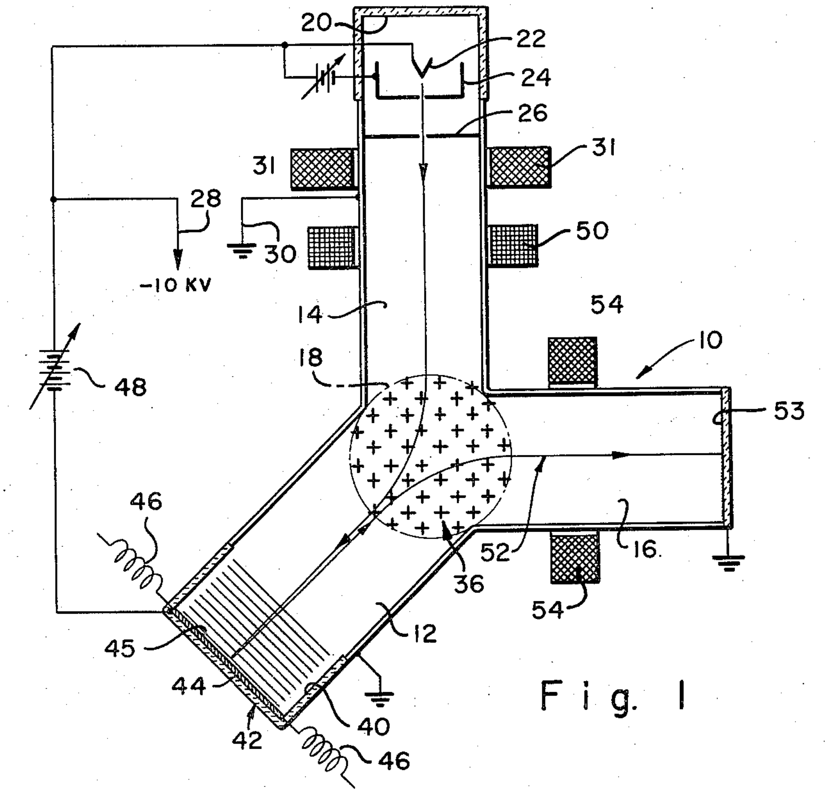
FIGURE 1 is a schematic plan view of an information recording and displaying apparatus embodying my invention.

The exemplary embodiment of the invention illustrated in the accompanying drawings comprises an evacuated envelope 10 formed by three horizontally disposed tubes 12, 14 and 16, respectively, which may be made of metal, such as copper, and which diverge radially from a common center area that may be formed by a vertically disposed tube 18. Secured to the remote end of tube 14 is a cap 20 of insulating material, and located in said cap is a cathode 22 which is surrounded by a control grid 24. An inwardly turned annular flange 26 at the end of tube 14 forms an anode that is kept at a high positive potential relative to the cathode 22 to direct the stream of electrons emitted by the cathode toward the center area 18 of the enclosure. In the embodiment of the invention illustrated in the accompanying drawings wherein the enclosure is made of copper tubing as pointed out above, the cathode 22 within the cap of insulating material may be held at a low negative potential, for instance −10 kv. as indicated at 28, in which case the anode structure formed by the tube 14 and especially the flange 26 at the end of said tube may be held at ground potential as indicated by the grounded lead 30.

Wound around the tube 14 is a magnetizing coil 31 which is arranged, upon energization, to focus the stream of electrons emitted by the cathode into a narrow beam. Means are provided in the center area of the three-legged enclosure to deflect the stream of electrons, emitted by the cathode 22 and accelerated toward the center of the enclosure by the anode 26, into the tube 12. For this purpose series-connected magnetizing coils **32*a* and 32*b* are provided at the upper and lower end of the tube 18, and said coils are arranged around short iron cores 34*a* and 34*b*, respectively, that extend into the interior of the enclosure as best shown in FIGURE 2. Upon energization of the coils 32*a* and 32*b*, a practically homogeneous magnetic field is formed between the inner ends of the cores 34*a* and 34*b*, extending vertically through the center area 18 of the enclosure from the top to the bottom thereof as indicated by the arrow tails 36 in FIGURE 1. Whenever an electron beam enters this field, it is deflected by the Lorentz forces in clockwise direction as viewed in FIGURE 1, and by appropriate choice of the strength of the energizing current pressed through the coils 32*a* and 32*b*, the deflection of the beam effected by the magnetic field 36 may be controlled in such a manner that the deflected beam extends substantially parallel to the axis of tube 12**.

The end of tube 12 is closed off by a cap 40 of insulating material, the bottom 42 of which is provided with a layer 44 of a conductive magnetizable material, such as iron. Alternatively, the bottom of the cap may be made of an electrically conductive material provided with an internally located layer of magnetizable material. Upon the layer of magnetizable material information may be recorded in the form of fringe field establishing information bits. To magnetize the total surface of the layer, so that information bits may be recorded thereon by changing the magnetism of certain predetermined spots thereof, or to erase previously recorded information bits, suitable magnetizing coils may be provided exteriorly of cap 40 as indicated at 46 in FIGURE 1.

Figure 2:
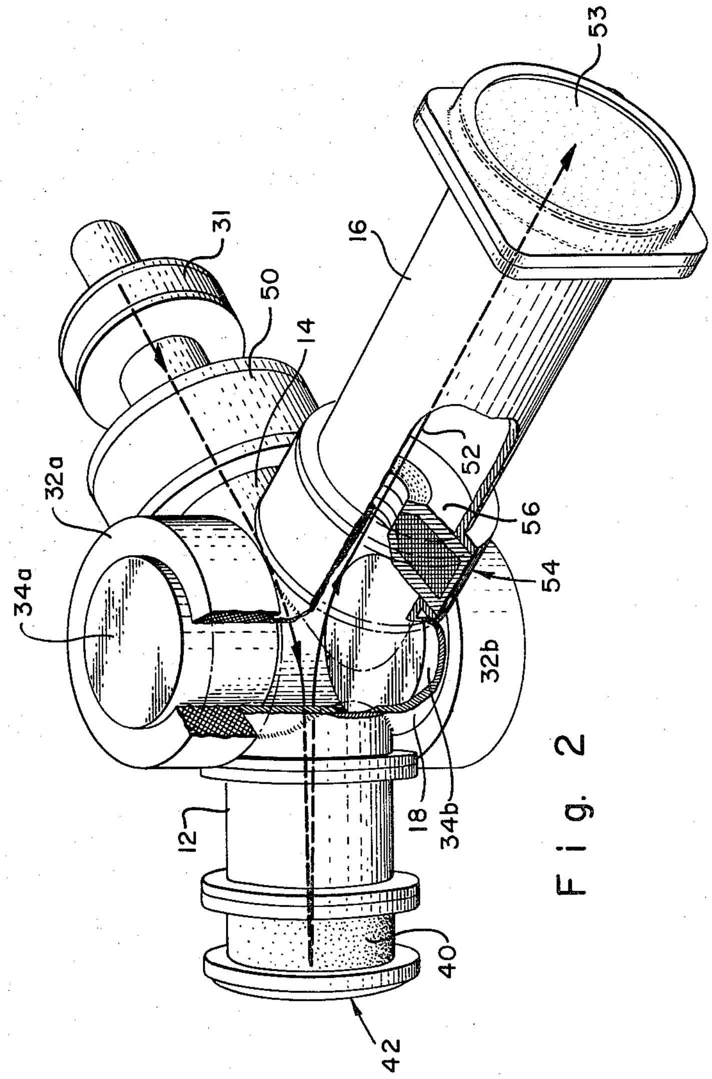
FIGURE 2 is a perspective of the apparatus shown in FIGURE 1, with parts thereof broken away to expose internal components of the apparatus.

To record information in the form of fringe field establishing information bits upon the inner surface 45 presented by the layer of magnetizable material, said layer is first placed at a positive potential relative to the electron emitting cathode 22, which may be accomplished by appropriate setting of the variable biasing battery indicated at 48 in FIGURE 1. Then the focusing coil 31 is energized to focus the beam of electrons emitted by the cathode 22 to a pin point, and said beam is directed to predetermined spots of the magnetized surface for sufficiently long a period of time to raise the temperature of these spots to a degree whereat their magnetism will change. For directing the focused beam of electrons to preselected spots of the magnetized surface, the tube 14 may carry a conventional magnetizing yoke, indicated schematically at 50 in FIGURE 1.

To discover and indicate the presence of information bits upon the layer 44 by means of the electron beam emitted from the cathode 22, it is necessary to place the layer at a potential relative to the cathode whereat the electrons are unable to reach the surface of the layer but turn round in a region sufficiently closed to said surface to enter magnetic fringe fields such as are produced by magnetically established information bits recorded thereon. For this purpose the layer 44 is set to a potential that is at least equal and preferably slightly more negative than the cathode 22, which may again be accomplished by appropriate setting of the hereinbefore mentioned biasing battery 48.

With the recording surface 44 biased as indicated, the electrons in the beam directed against said surface by the anode 26 and the turning field 36 reach zero velocity a minute distance in front of the inner surface of the layer 44, turn about and move in the opposite direction away from the recording surface along a path closely adjacent and substantially parallel to the path along which they approached said surface, provided they encounter no fringe fields at the time they reach a point of zero velocity adjacent said surface. If they do encounter any such fringe fields, however, they are deflected in a direction parallel to the recording surface by a component of said field, and in reversing their movement they therefore depart laterally from a course parallel to their initial course of movement.

When the reflected electron beam reaches the center area of the apparatus, it enters again the magnetic turning field 36 established by the coils 32*a* and 32*b* and is again turned in a clockwise direction as viewed from the top in FIGURE 1; and since the radial legs 14 and 16 of the enclosure are arranged symmetrically with regard to the leg 12 as best apparent from FIGURE 1, the turning field 36 swings the reflected electron beam into the third leg 16. By arranging a light emissive screen 53 at the end of said third leg in the path of the reflected beam it is possible to display on said screen visually the condition of the recording surface area from which it was reflected; in other words, the image created upon the screen 53 by the reflected beam exhibits the presence and location of any magnetic fringe fields in the surface area from which the beam was reflected, due to the fact that the components of the beam were reflected in a different manner depending on whether or not they encountered magnetic fringe fields in the recording surface area that is reproduced upon the light emissive screen. In fact, I have found that the image produced on the light emissive screen by the reflected electron beam will visually display any condition at, or adjacent to, the recording surface which creates in the equipotentials adjacent said recording surface an irregularity that has a deflecting effect upon the return path of the electrons. Thus, the apparatus of my invention is capable of visually displaying physical irregularities of the recording surface so that code bits etched into the recording surface will become clearly visible on the screen 53, and if the recording surface is formed by a layer of dielectric material placed over a conductive sheet, the presence and location of discrete electrostatic charges on the dielectric surface, such as may be used to record information in the form of electrostatic bits, may be visually displayed on said screen. Furthermore, due to the fact that the screen 53 is located in a region removed from the center axis of the tubular leg 14 wherein the electron beam originates, and also from the center axis of the tubular leg 12 which contains the recording surface from which it is reflected, the image of any area of the recording surface produced on screen 53 will always be complete and will not be mutiliated by structural arrangements such as are necessary to provide for unobstructed passage of the beam from the cathode to the recording surface whenever the incident and the reflected beam traverse the same region.

When the described apparatus is employed to record information bits by Curie point writing upon the inner surface of the plate 44, the stream of electrons emitted by the cathode 22 should be focused by appropriate energization of the focusing winding 31 to strike the recording surface in point form, as pointed out hereinbefore. When scanning the recording surface 44, however, to ascertain and indicate the presence of information bits thereon, a flood beam, i.e., a relatively broad beam, may be employed to cover relatively large areas of the recording surface and no focusing of the initial beam by energization of the coil 31 is necessary. In fact, I have found that a slightly divergent beam, such as may be established by appropriate arrangement of the equipotentials in the region directly in front of the recording surface, will provide exceptionally good resolution of the recording bits displayed in the image created on the light emissive screen. Similarly, I have found that superior results may be obtained by directing the electron beam toward the recording surface at an angle of slightly less than 90°, which may be accomplished by proper control of the strength of the turning field 36 established by energization of the magnetizing coils 32*a* and 32*b*. Moreover, by focusing the reflected beam after it has passed the turning field 36 and entered tube 16 by means of a suitable magnetizing winding 54 arranged around the tube 16, it is possible to produce an enlarged image of any scanned areas of the recording surface upon the screen and thus provide excellent resolution even of recordings of very high density.

Figure 3:
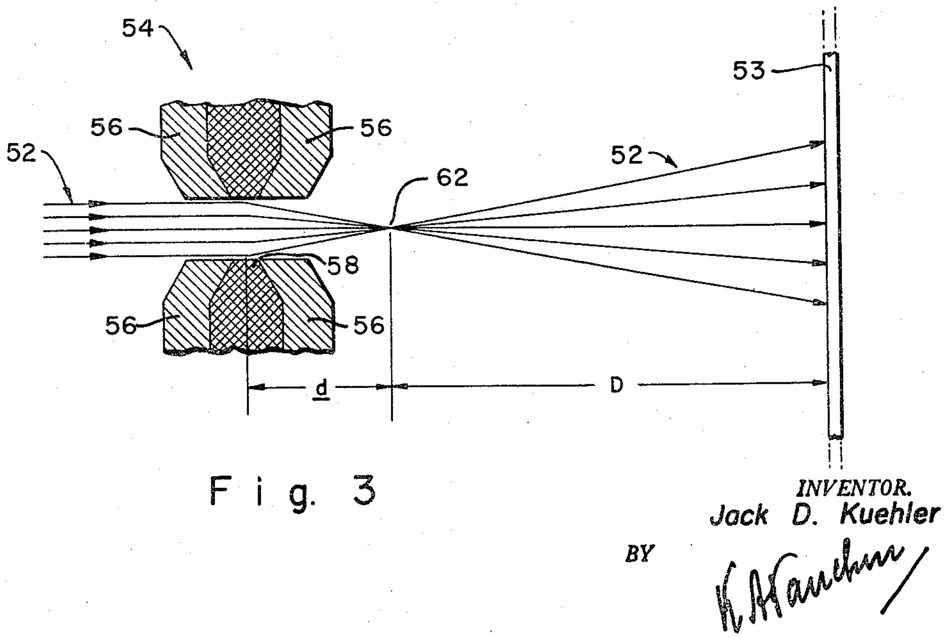
FIGURE 3 is a schematic detail view of the apparatus shown in FIGURES 1 and 2, illustrating an arrangement for displaying the image of the scanned recording surface areas on an enlarged scale.

Having particular reference to FIGURE 3, in leg 16 of the enclosure the reflected beam 52 is passed through the center of the winding 54. This winding is encased in a shell 56 of magnetic material except for an internally located annular gap indicated at 58. Upon energization of the winding 54 the magnetic force lines leaking across the annular gap 58 act upon the beam 52 concentrically, causing its components to converge to a focal point 62 located a limited distance $d$ beyond the center point of the winding, in a manner similar to the effect of a projector lens of short focal length upon a light beam. By appropriately choosing the location of the focal point relative to the plane of the light emissive screen 53, i.e., by locating the focal point at a distance D from the screen 53 that is substantially larger than the distance $d$, the components of the electron beam have diverged to such a degree by the time they strike the light emissive surface that they produce a much enlarged image of the area of the recording surface from which the electron beam was reflected, and by controlling the energizing current passed through the winding 54, the degree of magnification of the image, and hence the resolution provided by the image, may be controlled within wide limits.

The apparatus of the invention is of a compact and relatively simple construction. It may be employed to record information with the aid of Curie point writing upon a magnetizable surface, such as presented by a conductive magnetizable layer on the bottom of cap 40 or a magnetizable film or tape overlying a conductive sheet that may be placed upon or form the bottom of the cap 40 on the end of tube 12. For the purpose of recording information the focusing winding 31 is energized and the conductive magnetizable layer 44 or the conductive sheet against which a film or tape section is held is set to a positive potential relative to the cathode by appropriate adjustment of the biasing battery 48. The apparatus of the invention may also be used to scan a recording surface adjacent the bottom of cup 40 for information bits recorded thereon and display the presence and location of any such information bits visually on the light emissive screen 53, whether these bits are formed by magnetic fringe fields, electrostatic charges or physical surface inequalities. It is merely necessary to set the recording surface to a potential relative to the cathode at which it will act as an electron mirror and to shift the electron beam emitted by the cathode 22 across the recording surface by means of the magnetic deflection yoke 50, without energizing the focusing coil 31. The condition of the recording surface will then appear on the light emissive screen 53, with the spots where the scanning electron beams encountered information bits clearly visible on said screen; and if it is desirable to have a more detailed view of the searched areas of the recording surface, it is merely necessary to energize the focusing winding 54 upon tube 16 to an appropriate degree and enlarged images of the scanned areas providing any desired degree of resolution will appear on the screen 53. If it is desired to convert the fluorescent light pattern produced on the light emissive screen by the reflected scanning beam into electric signals, a vidicon or orthicon tube may be mounted in front of the screen.

I have primarily explained my invention as employed to store information in the form of magnetic fringe fields upon a magnetizable recording surface and to visually display the presence and location of such magnetic fringe fields upon a viewing screen. However, as pointed out repeatedly hereinbefore, my invention may also be employed to visually display information that has been stored in the form of etched areas on a conductive surface or of electrostatic charges upon a dielectric film that overlies a conductive surface.

While I have explained my invention with the aid of a preferred embodiment thereof, it will be understood that the invention is not limited to the specific constructional details shown and described by way of example which may be departed from without departing from the scope and spirit of the invention.

I claim:

1. Apparatus for visually displaying magnetic information bits on a recording surface comprising means for emitting a beam of electrons in a predetermined direction, a magnetic target surface located laterally removed from the axis of said beam, means along the axis of said beam for turning the beam toward said target surface, means for applying a potential to said target surface for reflecting the beam at a distance from said surface sufficiently close to said surface to expose the approaching electrons to the deflecting effect of magnetic fringe fields originating in said target surface, a light emissive screen placed into the path of the reflected beam, and means adjacent the path of the reflected beam to focus the reflected beam at a point a predetermined distance in front of said screen to create thereon an enlarged image of the target area from which the beam is reflected.

2. Apparatus for visually displaying the presence of information bits upon a recording surface comprising means for emitting an electron beam in a predetermined direction; a magnetic target surface located laterally removed from the axis of said beam; means along the axis of said beam for establishing a magnetic field across said beam to turn said beam toward said target surface; means for applying a potential to said target surface relative to said electron emitting means, to reflect the beam back to said magnetic turning field at a distance from said target surface sufficiently close thereto to expose the approaching electrons to the deflecting effect of magnetic fringe fields originating in said target surface due to information bits recorded thereon; a light emissive screen placed into the path of the reflected beam after it has passed through and been turned by said magnetic turning field, to create on said screen an image of the target area from which the beam is reflected; and a focusing coil arranged around the path of the reflected beam at a point intermediately of the magnetic turning field and said screen for varying the size of the image created upon said screen.

3. Apparatus for recording information bits on a recording surface and for visually displaying the presence and location of information bits on said recording surface comprising an enclosure having three tubular legs diverging from a common center area; a magnetic recording surface provided at the end of a first one of said tubular legs, an electron emitting electrode provided at the end of a second one of said tubular legs; means for directing the electrons emitted by said electrode in a beam toward said common center area, means on said second tubular leg operable to focus the electron beam emitted from said electrode, means on said second tubular leg operable to shift the beam of electrons emitted by said electrode, means at said center area for turning the beam of electrons emitted from said electrode into said first tubular leg toward said recording surface, means selectively operable to apply a potential to said recording surface to cause the beam of electrons emitted by said electrode to reach said recording surface or to reflect said beam toward said turning means at a distance sufficiently close to said recording surface to expose the approaching beam of electrons to the deflecting effect of magnetic fringe fields originating in said surface; and a light emissive screen at the remote end of the third tubular leg exposed to impingement by the electron beam reflected from said recording surface and directed into said third tubular leg by said turning means.

4. Apparatus for recording information bits on a recording surface and for visually displaying the presence and location of recorded information on said surface comprising an enclosure having three tubular legs diverging from a common center area; a magnetic recording surface provided at the remote end of a first one of said tubular legs, an electron emitting electrode provided at the remote end of a second one of said tubular legs; an anode provided in said second tubular leg; means for applying a high positive potential to said anode relative to said electrode to direct the electrons emitted by said electrode in a beam toward said common center area, means on said second tubular leg operable to focus the electron beam emitted from said electrode, means on said second tubular leg operable to shift the beam of electrons emitted by said electrode, means for establishing a magnetic field through said center area to turn the beam of electrons emitted from said electrode into said first tubular leg toward said recording surface, means selectively operable to apply a potential to said recording surface to cause the beam of electrons emitted by said electrode to reach said recording surface or to deflect said beam toward said magnetic turning field at a distance sufficiently close to said recording surface to expose the approaching beam of electrons to the deflecting effect of magnetic fringe fields originating in said surface; and a light emissive screen at the remote end of the third tubular leg exposed to impingement by the electron beam reflected from said recording surface and directed into said third tubular leg by said magnetic turning field.

5. Apparatus for recording information bits on a recording surface and for visually displaying the presence and location of recorded information on said surface comprising an enclosure having three tubular legs diverging from a common center area; a magnetic recording surface provided at the remote end of a first one of said tubular legs, an electron emitting electrode provided at the remote end of a second one of said tubular legs; an anode provided in said second tubular leg; means for applying a high positive potential to said anode relative to said electrode to direct the electrons emitted by said electrode in a beam toward said common center area, means on said second tubular leg operable to focus the electron beam emitted from said electrode, means on said second tubular leg operable to shift the beam of electrons emitted by said electrode, means for establishing a magnetic field through said center area to turn the beam of electrons emitted from said electrode into said first tubular leg toward said recording surface, means selectively operable to apply a potential to said recording surface to cause the beam of electrons emitted by said electrode to reach said recording surface or to deflect said beam toward said magnetic turning field at a distance sufficiently close to said recording surface to expose the approaching beam of electrons to the deflecting effect of magnetic fringe fields originating in said surface; a light emissive screen at the remote end of the third tubular leg exposed to impingement by the electron beam reflected from said recording surface and directed into said third tubular leg by said magnetic turning field, and a focusing coil wound around said third tubular leg to focus the reflected beam at a point a selected distance in front of said screen and thus vary the magnitude of the image created on said screen.

References Cited in the file of this patent

UNITED STATES PATENTS

| | | |
|---|---|---|
| 2,222,955 | Orthuber | Nov. 26, 1940 |
| 2,467,009 | Bull | Apr. 12, 1949 |
| 2,901,627 | Wiskott | Aug. 25, 1959 |
| 2,928,943 | Bartz | Mar. 15, 1960 |